United States Patent

Massaro, Jr. et al.

[11] 4,173,060
[45] Nov. 6, 1979

[54] SYSTEM AND METHOD FOR RETUBING A STEAM GENERATOR

[75] Inventors: Anthony A. Massaro, Jr., Monroeville; Harry N. Andrews, Franklin Township, Westmoreland County, both of Pa.

[73] Assignee: Westinghouse Electric Corp., Pittsburgh, Pa.

[21] Appl. No.: 809,588

[22] Filed: Jun. 24, 1977

[51] Int. Cl.² .................... B23P 7/00; B23P 17/00; B23P 15/26
[52] U.S. Cl. .................................. 29/157.4; 176/30; 165/76; 29/402.08; 29/426; 29/157.3 C; 29/723; 29/400 N; 29/726; 29/568; 29/722; 29/564.3

[58] Field of Search ............... 29/157.3 C, 157.3 A, 29/157.3 B, 568, 401 F, 401 E, 401 B, 401 D, 401 R, 722, 723, 726, 400 N, 157.4, 426, 427, 564.3; 113/118 B, 118 C; 165/76; 176/27, 30

[56] References Cited

U.S. PATENT DOCUMENTS

| 2,557,356 | 6/1951 | Little | 165/76 |
| 3,640,339 | 2/1972 | Pacault et al. | 165/76 |
| 3,914,904 | 10/1975 | Rutherford | 29/157.4 |

Primary Examiner—C. W. Lanham
Assistant Examiner—V. K. Rising
Attorney, Agent, or Firm—F. J. Baehr, Jr.

[57] ABSTRACT

A system and method for retubing a steam generator for a pressurized water reactor while the steam generator is in place in a containment vessel.

19 Claims, 9 Drawing Figures

SYSTEM AND METHOD FOR RETUBING A STEAM GENERATOR

BACKGROUND OF THE INVENTION

This invention relates to steam generators for a pressurized water reactor and more particularly to a system and method for retubing the steam generator while the steam generator is disposed vertically in a containment vessel.

Pressurized water nuclear reactors utilize steam generators to transfer heat from a primary reactor coolant to a secondary fluid which is vaporized forming steam that drives a steam turbine. Consenser leaks have caused circulating water, which is often brackish, to mix with the secondary fluid and enter the steam generator, resulting in the buildup of undesirable chemicals in the steam generator. Water treatment and blowdown have not completely protected the steam generator from corrosion, resulting in leaking tubes. As the number of leaking tubes increases the desirability of replacing a steam generator increases; however, the steam generators are located in a reinforced concrete vessel, a containment vassel, and removal of the steam generator requires tearing out a large portion of the reinforced concrete walls of the containment vessel. This is time consuming and expensive, therefore it is desirable to retube the steam generator in place within the containment vessel.

SUMMARY OF THE INVENTION

In general, a system for retubing a steam generator having a shell with an enlarged upper portion, a tube sheet with a channel head, a plurality of U-shaped tubes forming a tube bundle and a wrapper encircling the tube bundle, when utilized with the steam generator in a vertically disposed position within the containment vessel, and when utilized in accordance with this invention, comprises a device for parting the shell by making a circumferential cut, thereby forming an upper and lower portion, a device for removing the upper portion of the shell, a hood for enclosing the lower portion of the shell, when the upper portion is removed, and a device for circulating air downwardly through the lower portion of the shell and for filtering the air to remove particulate material from the air leaving the lower portion of the shell. The system further comprises a gondola large enough to house at least one man in a controlled environment. A portion of the gondola is made of lead glass to provide visibility within the shell and to protect the man from radioactive material within the shell. The system also has a device for raising and lowering the gondola in the shell and for fixing the position on the gondola within the shell. The gondola has a device for cutting metal cooperatively associated therewith and controlled therefrom and means for removing from the shell, metal cut by the metal cutting device. The system also utilizes a device operable from the channel head for cutting the tubes adjacent the tube sheet and for removing the tube to tube sheet weld and ultimately for removing a portion of the tube from the tube sheet. The portions of the tubes in the shell which includes the majority of the tubes and the bent portion is removed piecemeal or as a unit. A tube support structure having a plurality of tube support positions disposed at a plurality of locations along the length of the tubes and having a distribution plate disposed adjacent the tube sheet is placed within the wrapper and the shell. Tubes are replaced, utilizing a device that assists the tube to enter the proper hole in the support structure and in the tube sheet. The system also comprises a device for expanding a portion of the tube into engagement with the tube sheet once the end is passed therethrough, a device for welding the ends of the tubes to the tube sheet, and a device for expanding the remainder of the tubes into engagement with the tube sheet.

BRIEF DESCRIPTION OF THE DRAWINGS

The objects and advantages of this invention will become more apparent from reading the following detailed description in connection with the accompanying drawings, in which:

FIG. 6 is a sectional view of a lower portion of

DESCRIPTION OF THE PREFERRED EMBODIMENT

Figure 1:
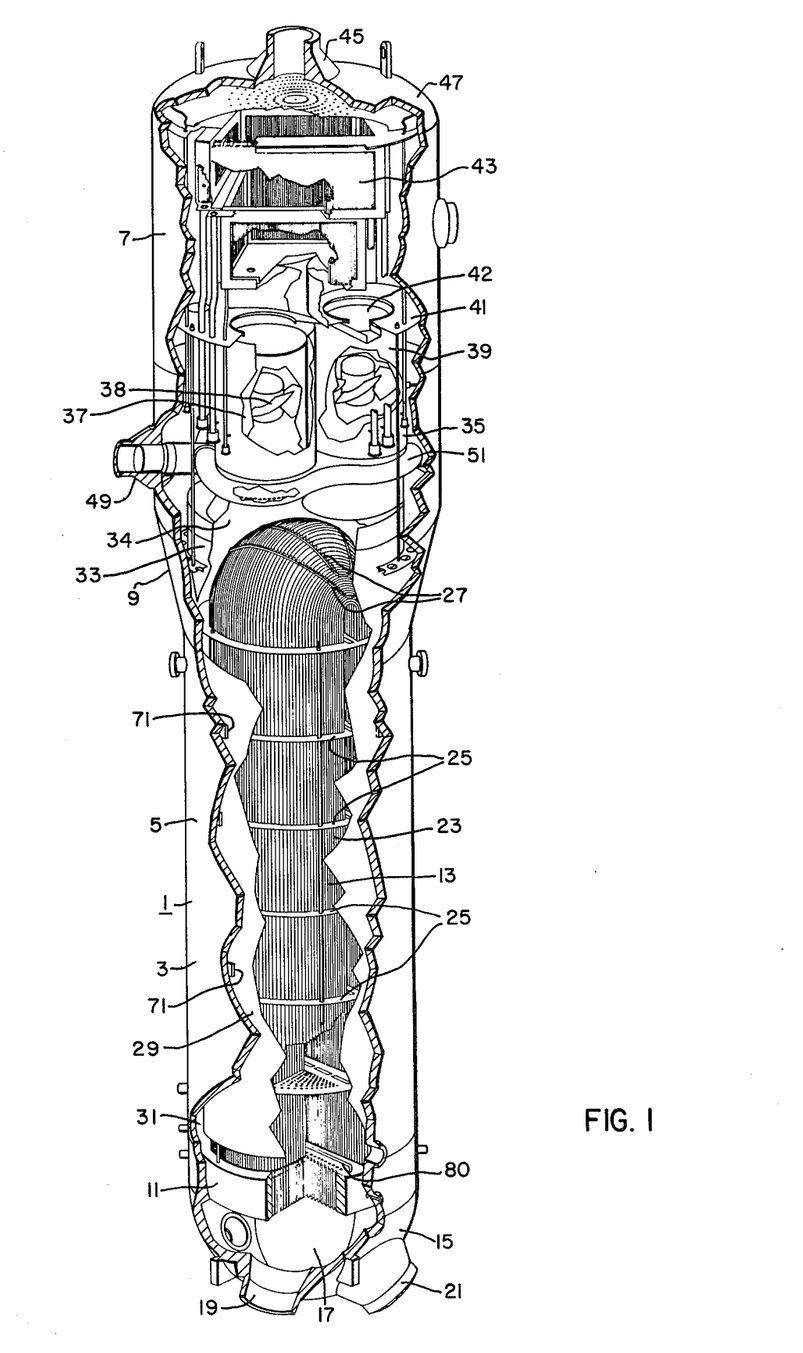
FIG. 1 is a perspective view of a steam generator partially in section.

Referring now to the drawings in detail, and in particular to FIG. 1, there is shown a steam generator 1 having a vertically oriented shell 3, the shell 3 comprising a lower cylindrical portion 5 and an upper cylindrical portion 7, larger in diameter than the lower portion 5, and a frustoconical transition portion 9 joining the upper and lower portions 7 and 5, respectively. A tube sheet 11 is disposed on the lower end of the lower portion 5 of the shell and has a plurality of holes for receiving ends of U-shaped tubes 13 which extend upwardly from the tube sheet 11.

A hemispherical channel head 15 is fastened to the tube sheet 11 and has a splitter sheet 17 disposed therein. A primary fluid inlet nozzle 19 supplies effluent primary fluid to one portion of the channel head 15 and a discharge nozzle 21 is disposed in the channel head 15 to return the effluent primary fluid to a reactor (not shown).

The U-shaped tubes 13 are closely packed, forming a tube bundle 23 which is disposed vertically within the lower portion 5 of the shell 3. A plurality of support plates 25 are disposed throughout the tube bundle 23 to support the tubes 13 at various locations along their length to reduce flow induced vibrations. Anti-vibrations bars 27 are also disposed adjacent the bends in the tubes 13 to prevent vibration in this portion of the tube bundle 23.

A wrapper or sleeve 29 is disposed between the tube bundle 23 and the shell 3 so as to form an annular space 31 therebetween. The upper end of the wrapper 29 is enclosed by a domed cap 33 which has a plurality of openings 34 disposed therein in fluid communication with centrifugal moisture separators 35. The centrifugal moisture separators 35 are made up of two portions, a lower portion 37 formed from a cylindrical member encircling a plurality of swirl vanes 38 and an upper sleeve portion 39 which is fastened to an orifice plate 41 which has orifices 42 that register with the sleeve portions 39 to permit steam that has centrifugally shed some of its entrained moisture to enter the upper portion of the steam generator.

A second stage moisture separator 43 is disposed in the upper portion of the steam generator for removing the remaining moisture from the steam before it enters a steam outlet nozzle 45 centrally disposed in an upper dished head 47 which encloses the upper end of the steam generator.

A feedwater inlet nozzle 49 and feedwater distribution ring 51 are disposed in the lower end of the enlarged portion or upper portion of the steam generator adjacent the transition member 9.

A system and/or method for retubing the steam generator 1 while it is vertically oriented in a containment vessel (not shown) comprises removing insulation from the outer side of the shell 3, particularly removing the insulation from the area just above the transition member 9 and feedwater inlet nozzle 49.

Depending on such things as the headroom in the containment vessel, the length of the tubes and the way in which the tubes are to be removed and replaced, a determination is made regarding the elevation at which the steam generator shell 3 is to be parted or cut. Parting or cutting of the shell is made by a circumferential cut at as high an elevation on the shell 3 as possible. The cut is preferably made by grinding; however, other well known steel cutting techniques such as oxygen-acetylene, air arc, plasma burning or other cutting means may be utilized. To facilitate rewelding the upper portion of the shell to the lower portion when retubing is complete, a circumferential track 53 and automatic drive means 55 are recommended to ensure a uniform cut at the proper angle for rewelding. Therefore, it is preferred that the parting be done by grinding as this cutting process produces the most precise cut. The track 53 and drive means 55 may also be utilized to form the closure weld on the shell after retubing is complete.

Clips are installed bridging the cut to maintain the relative position of the upper and lower portion of the shell during the cutting and welding operation to assure uniformity in the cut and weld.

During the period of preparation for parting the steam generator and also during the parting operation, other operations may be performed simultaneously. The steam outlet pipe is cut from the steam outlet nozzle 45, manways 46 are removed and work within the steam generator begins. The channel head 15 may be decontaminated. The seal weld between the tube and the tube sheet is also removed by grinding or cutting means, which cuts away the area of the weld between the tube and tube sheet. Even though the head 15 may be decontaminated, the level of radioactivity in the head 15 may still be high due to radioactive deposits within the tubes so that a grinding or cutting tool which can be remotely operated, as shown in FIG. 6, is preferred.

Figures 2, 3:
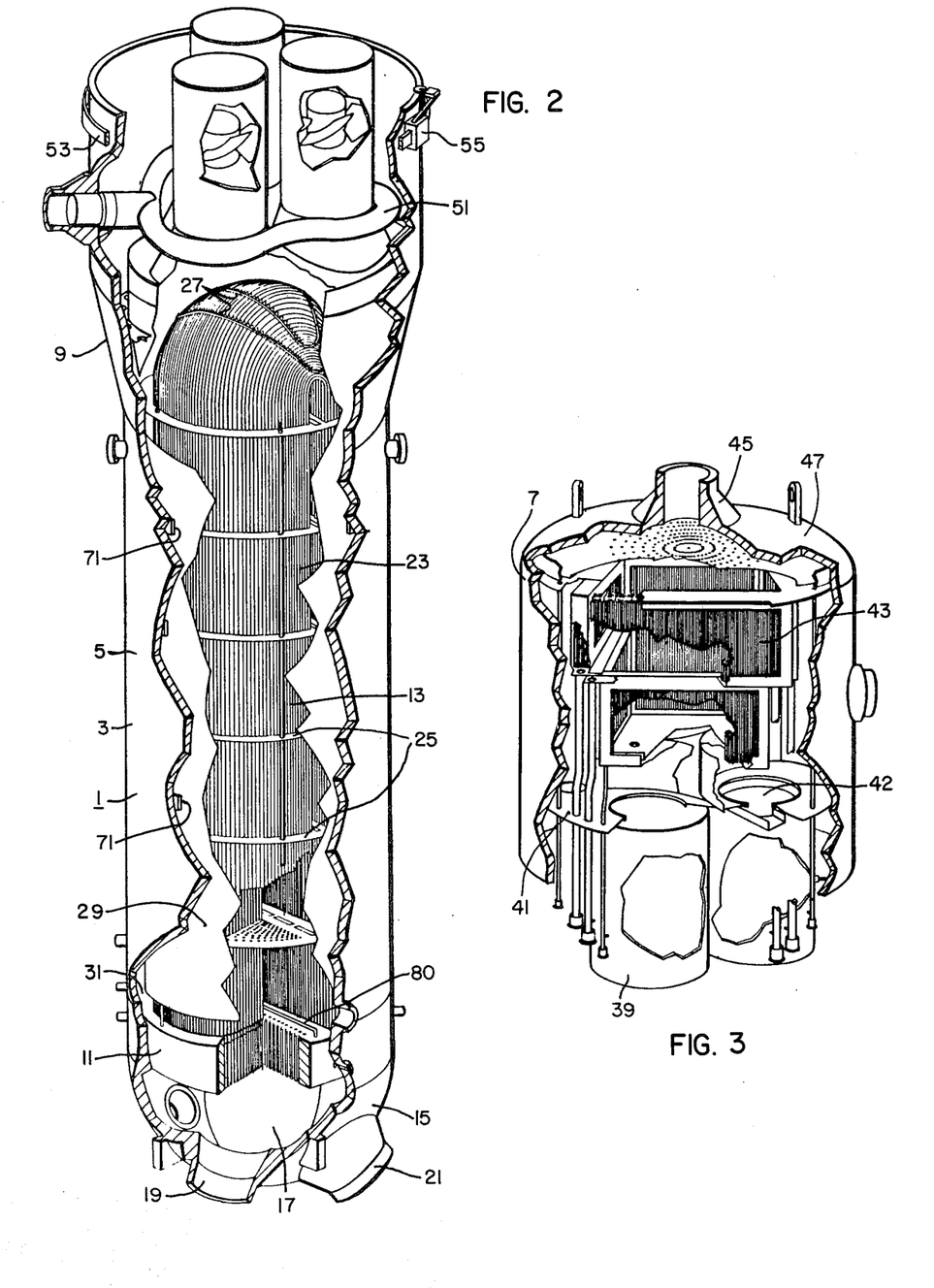
FIG. 2 is a perspective view of the lower portion of the steam generator.
FIG. 3 is a perspective view of the upper portion of the steam generator.

Once the shell 3 is parted, as shown in FIGS. 2 and 3, the upper portion 7 of the shell is removed together with the second stage of the moisture separator 43, the orifice plate 41 and sleeves 39 which are attached to the upper portion 7 of the shell and are removed therewith.

Figures 4, 5:
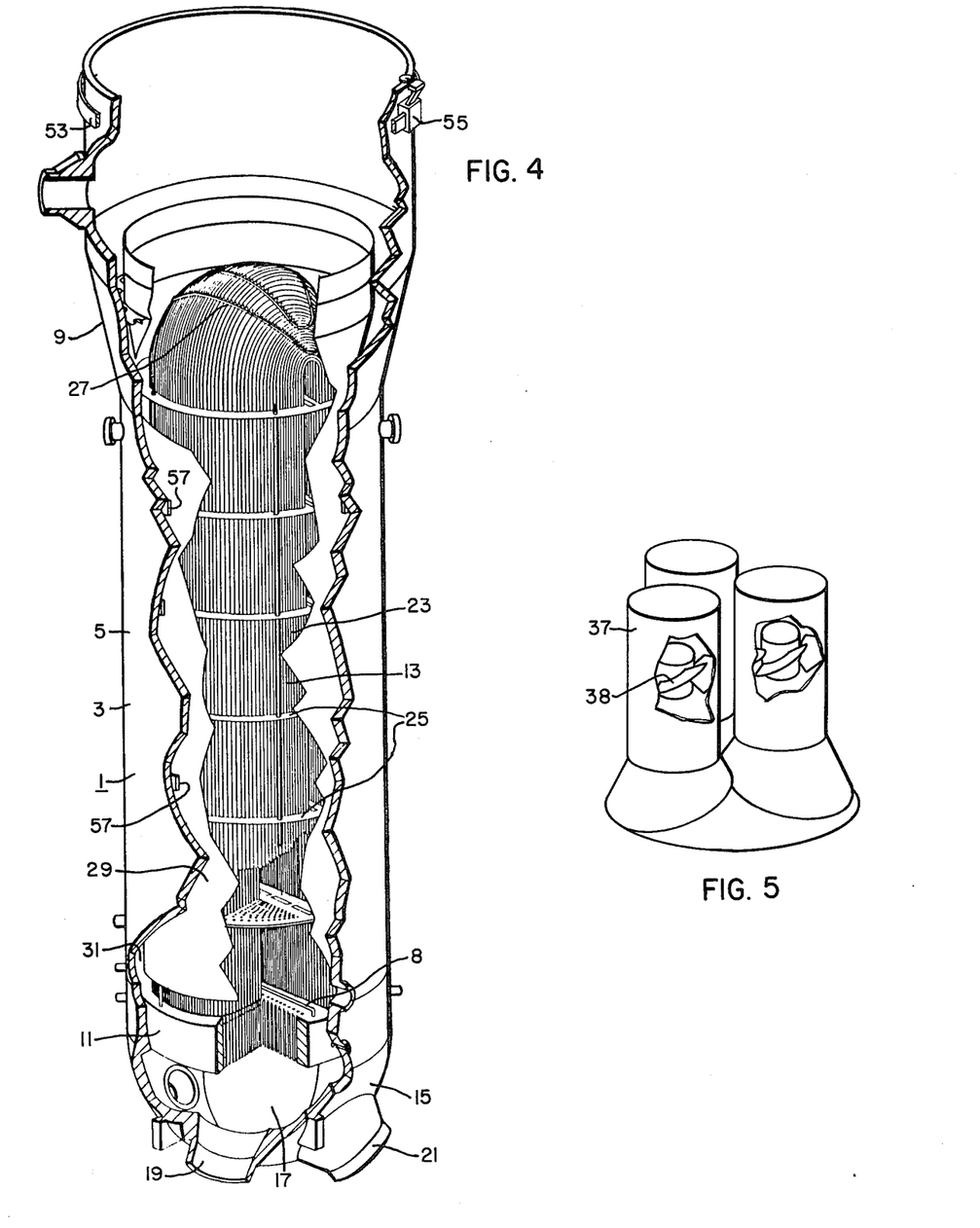
FIG. 4 is a perspective view of the lower portion of a steam generator with additional parts removed.
FIG. 5 is a perspective view of a portion of the moisture separator removal apparatus.

The feedwater distribution ring 51 is cut from the feedwater nozzle 49 and removed. The cap 33 is cut from the wrapper 29 and removed along with the cylinder 37 and swirl vanes 38 as shown in FIGS. 4 and 5.

Figure 6:
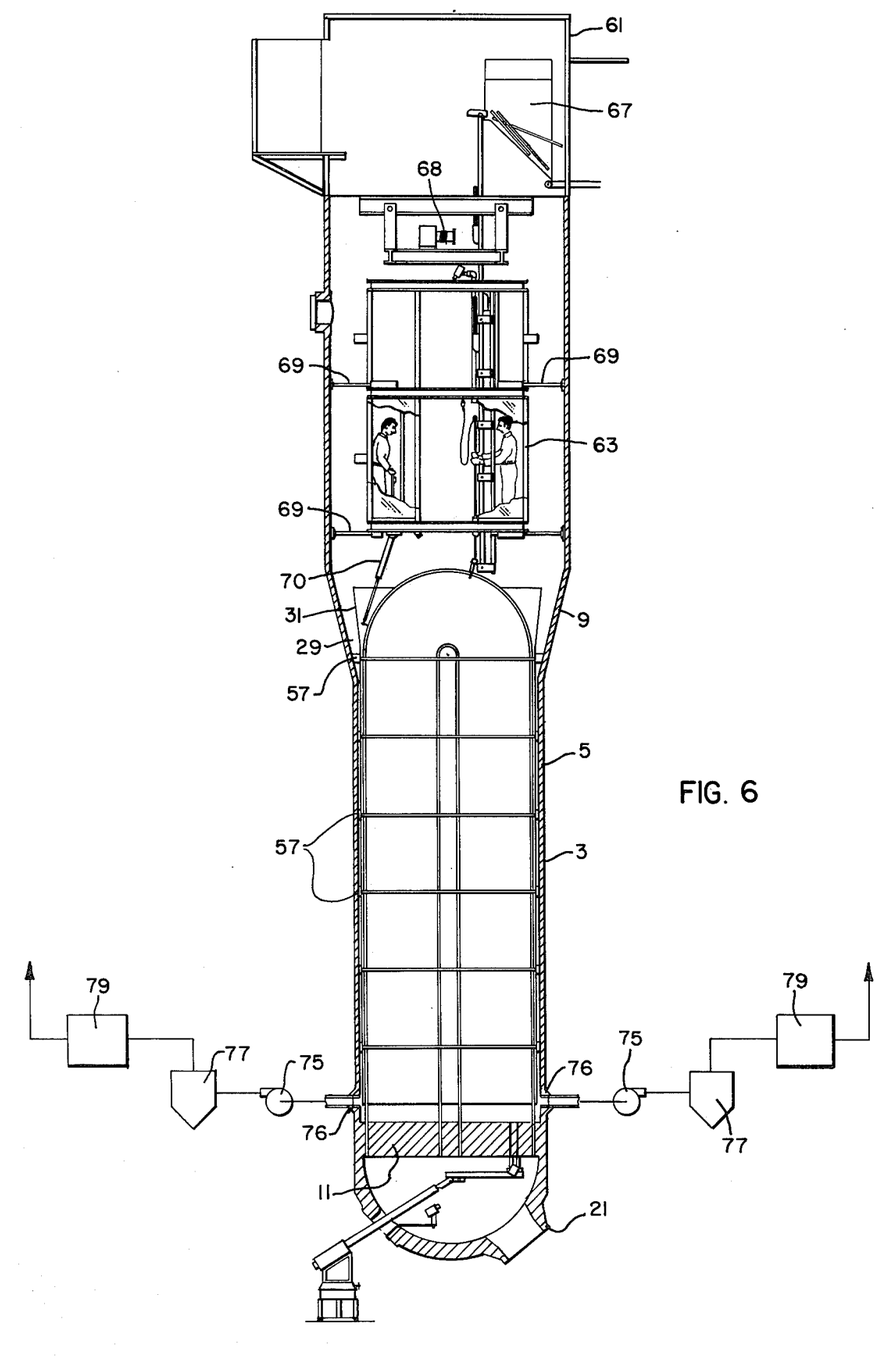

An enclosure 61, as shown in FIG. 6, is placed over the lower portion 5 of the shell. The enclosure 61 contains a gondola 63 capable of housing one or more men and protecting them from radioactivity within the steam generator. The gondola 63 is provided with a self-contained environment and is made in part of lead glass to protect the men from radiation and to provide visibility to the internals of the steam generator.

Figure 7:
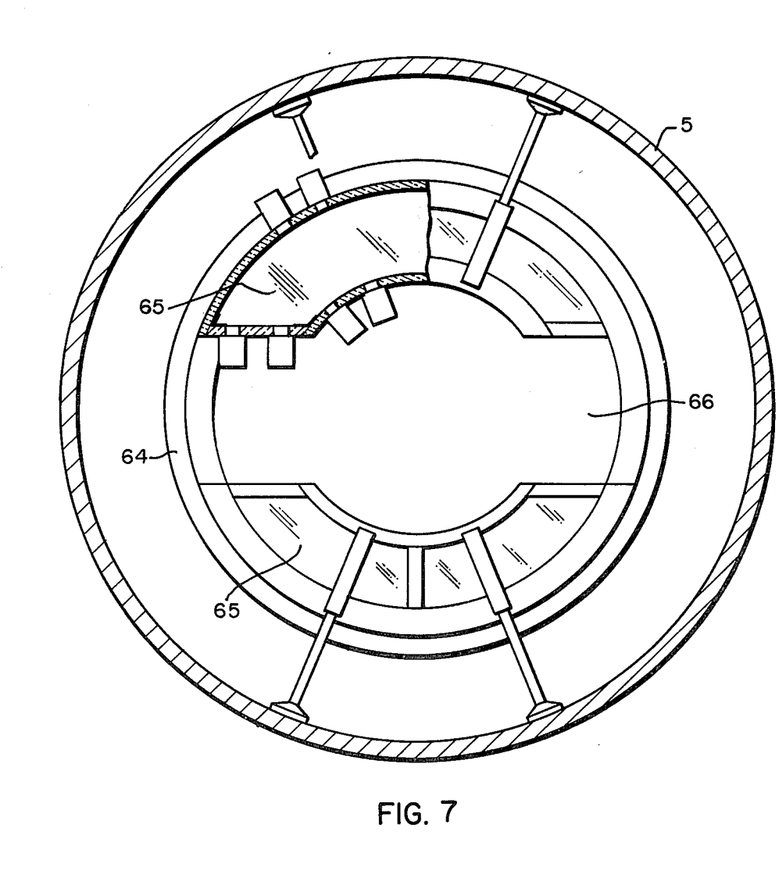
FIG. 7 is a sectional view taken on line VII—VII of FIG. 6.

As shown in FIG. 7, the gondola 63 has a generally circular frame 64 with two compartments 65 disposed in opposing segments of the frame 64. The compartments are disposed to provide an open space 66 therebetween to allow parts removed from the internals of the steam generator to pass through the open space 66 and into the enclosure 61 wherein they may be removed through some type of airlock 67. The enclosure 61 has a hoist or wench 68 which raises and lowers the gondola 63 within the lower portion of the shell. The gondola 63 also has arms 69 which are outwardly extendable for engaging the shell 3, the wrapper 29 or the enclosure 61 to hold the gondola 63 in a fixed position. A cutting device 70 such as a torch, grinder or other cutting means is cooperatively associated with, and remotely operated from the gondola 63. The cutting device 70 is capable of cutting the tubes 13 or pads 71 which attach the wrapper 29 to the shell 3.

The tubes 13 may be removed as a bundle 15 by cutting the pads 71 which attach the wrapper 29 to the shell 3 and severing each tube 13 above the tube sheet 11. Alternatively, the tubes 13 may be removed by successively cutting each tube 13 above each tube support plate 25. As the tubes are cut in segments, the segments must be removed. A hand 72 or other lifting device is operable from the gondola 63 and cooperatively associated therewith to pick up segments of tubes that have been cut free and move them to a conveyor 73 or other tube removal device disposed in the open space 66 in the gondola 63. The tube segments are compacted and placed in containers as they may be radioactive.

Induced draft fans 75 are disposed in fluid communication with hand holes 76 disposed in the shell above the tube sheet 11 causing a downward flow of air within the lower portions 5 of the shell 3. Centrifugal separators 77 and filters 79 are disposed in series with the fans 75 to trap particulate material exhausted from the fans 75.

The portion of the tubes extending through the tube sheet are removed either by pulling from the channel head 15 side of the tube sheet 11 or by pushing or pulling from above the tube sheet 11. Removing the tubes via the channel head 15 has the advantage of allowing the operation to be carried on simultaneously with the operations in the upper portion of the shell, thereby reducing the overall time necessary to retube the steam generator.

Once the tubes 13 are removed, blowdown pipes 80 are removed from the upper side of the tube sheet 11 and the upper side of the tube sheet 11 is cleaned, removing sludge and other debris therefrom. The holes in the tube sheet 11 are then cleaned by reaming or utilizing other cleaning techniques. The tube sheet 11 is then inspected and any necessary repairs are made. The blowdown pipes 80 are reinstalled.

Figure 8:
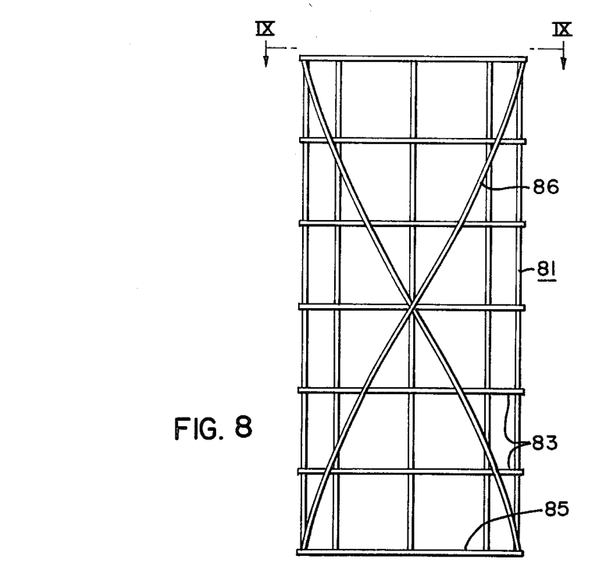
FIG. 8 is an elevational view of a tube support structure.
Figure 9:
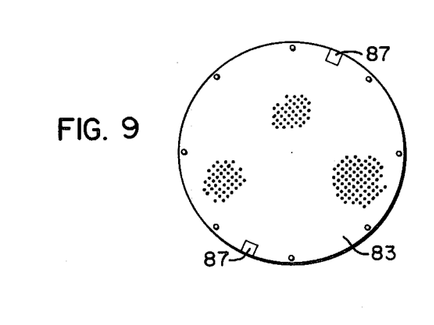
FIG. 9 is a sectional view taken on line IX—IX of FIG. 8.

The wrapper 29 is inspected, repaired or reinstalled, if it was necessary to remove it with the tubes 13. A tube support frame or assembly 81 is assembled into a unitized structure and comprises a plurality of tube support sheets or plates 83 and a distribution plate 85 joined together by support members 86 to form the unitized structure. A number of tubes 13 are disposed therein to assure alignment of the holes. Removable alignment rods or pins 87 are utilized to align the support sheets and distribution plate in the support structure and also to align the support structure with the tube sheet 11. The tube support sheets 83 have access patches or patch plates 87 disposed therein to provide access to the tubes 13 during the retubing operation. The patch plates 87 are fitted into place by welding or other means and tubes are inserted therethrough in order to complete the retubing operation.

The tube support assembly 81 is placed within the wrapper 29 and aligned with the holes in the tube sheet 11. Tubes 13 are installed utilizing a bullet-shaped tip which assists the tube 13 to find the hole as it is being slipped downwardly through the support plates 83 and into the holes in the tube sheet 11. The ends of the tubes 13 are rolled into the tube sheet 11 and a seal weld is made therebetween. The remainder of the tubes 13 are expanded into engagement with the tube sheet 11 so that there is engagement throughout that portion wherein the tubes and tube sheet are coextensive. Mechanical, hydraulic or explosive techniques are utilized to expand the tubes 13 in engagement with the tube sheet 11 after the tubes 13 are installed. Anti-vibration bars 91 are installed adjacent the U-bend portion of the tubes.

The cap 33 is inspected, repaired and replaced on the top of the wrapper 29 and welded in place by a circumferential weld. The feedwater ring 51 is installed and the upper portion of the shell is then replaced either by making a circumferential weld or by welding flanges to each portion of the shell and bolting the flanges together. Even if flanges are utilized, a circumferential seal weld ensures integrity of the flange joint. The welds on the shell either in the form of a circumferential weld attaching the upper and lower portions or welds to flange require preheating, heat treating and radiographic inspection. The steam generator is buttoned up, that is, all manholes and openings are closed and a hydrostatic test is performed to ensure integrity of the shell in order to comply with code requirements. Piping connections are made and the steam generator is ready for service. The system and method hereinbefore described advantageously upgrades a steam generator to allow continued operation of the nuclear reactor, and such repair and upgrading can be performed while the steam generator is vertically oriented in the containment vessel, substantially reducing the time that the nuclear rector is out of service.

We claim

1. A system for retubing a steam generator having a shell with an enlarged upper portion, a tube sheet with a channel head, a plurality of U-shaped tubes forming a tube bundle and a wrapper encircling the tube bundle, said system being operable when the steam generator is vertically disposed within a containment vessel and said system comprising:

means for parting the shell by making a circumferential cut, thereby forming an upper and lower portion;

means for removing the upper portion of the parted shell;

a hood for enclosing the lower portion of the parted shell when the upper portion is removed;

means for circulating air downwardly through the lower portion of the shell and for filtering the air to remove particulate material from the air leaving the lower portion of the shell;

a gondola large enough to house at least one man in a controlled environment, a portion of said gondola being made of lead glass to provide visibility within the shell and protect the man from radioactivity within the shell;

means for raising and lowering the gondola within the shells;

means for fixing the position of the gondola within the shells;

means for cutting metal cooperatively associated with the gondola and controlled therefrom;

means for removing the shell material cut by the metal cutting means;

means for cutting the tubes adjacent the tube sheet, the tube cutting means being operable from the channel head;

means for removing the portion of the tubes in the tube sheet therefrom;

means for removing the portion of the tubes in the shell therefrom;

a tube support structure having a plurality of tube support positions to support the tubes at a plurality of locations along their length, the tube support structure having a distribution plate disposed adjacent the lower end thereof to direct the flow of fluid flowing over the outside of the tubes to the central portion of the tube bundle when the steam generator is operating;

means for assisting the tubes to enter the proper hole in the tube sheet;

means for expanding a portion of the tubes in engagement with the tube sheet;

means for welding the ends of the tubes to the tube sheet; and means for expanding the remaining portions of the tubes that are coextensive with the tube sheet into engagement therewith.

2. The system as set forth in claim 1, wherein the system further comprises means for automatically forming a circumferential weld joining the upper and lower portion of the shell.

3. The system as set forth in claim 1, wherein the means for parting the shell comprises a circumferential track and a carriage which runs on the track and contains a grinder which cuts the shell.

4. The system as set forth in claim 1, wherein the hood is generally air-tight, utilizing airlocks to provide access and egress of men and material.

5. The system as set forth in claim 1, wherein the means for circulating the air downwardly through the lower portion of the shell and for filtering the air to remove particulate material comprises at least one fan in fluid communication with the shell via hand holes disposed adjacent the tube sheet, a centrifugal separator and a filter in fluid communication with the fan.

6. The system as set forth in claim 1, wherein the gondola has two compartments disposed opposite each other and a central opening disposed between the compartments.

7. The system as set forth in claim 1, wherein the means for raising and lowering the gondola comprises a hoist disposed in the hood and attached thereto.

8. The system as set forth in claim 1, wherein the means for fixing the position of the gondola within the shell comprises a plurality of arms that extend outwardly to contact the shell and wrapper.

9. The system as set forth in claim 1, wherein the means for cutting the metal cooperatively associated with the gondola and controlled therefrom is a plasma torch.

10. The system as set forth in claim 1, wherein the tube support structure is relatively rigid and the tube support positions have access openings to allow access to the support positions and to the tube sheet during the retubing operation.

11. A method for retubing a steam generator having a shell with enlarged upper portion, a tube sheet with a channel head, a plurality of U-shaped tubes which extend upwardly from the tube sheet to form a tube bundle and a wrapper encircling the tube bundle, the method being applicable to a steam generator vertically oriented in a containment vessel and comprising the steps of:

parting the shell by making a circumferential cut to form an upper and lower portion;
removing the upper portion of the shell;
enclosing the lower portion of the shell with a hood to form a generally air tight enclosure;
forcing air to flow downwardly through the shell by removing the air from the lower portion of the shell and filtering the effluent air to remove particulate materials;
placing a gondola partially made of lead glass in the shell; and
utilizing the gondola as a work station for directly observing and cutting the tubes in segments starting from the top of the tube bundle for removing the tubes from the steam generator;
installing a generally rigid tube support structure in the shell;
sliding tubes through the support structure and into holes in the tube sheet;
welding the tubes to the tube sheet; and
expanding the tubes into engagement with the tube sheet throughout the portion where they are contiguous; and
replacing the upper portion of the shell.

12. A method for retubing a steam generator having a shell with an enlarged upper portion, a tube sheet with a channel head, a plurality of U-shaped tubes which extend upwardly from the tube sheet to form a tube bundle, and a wrapper encircling the tube bundle, the method being applicable to a steam generator vertically oriented in a containment vessel and comprising the steps of:

making a circumferential cut in the upper portion of the shell;
removing the upper portion of the shell;
enclosing the lower portion of the shell with a hood to form a generally air tight enclosure;
cutting the tubes in segments and removing the cut segments starting at the U-bend and working downwardly toward the tube sheet;
removing the stub ends of the tubes from the tube sheet;
preparing the holes in the tube sheet to receive new tubes;
installing a tube support structure in the lower portion of the shell;
installing new tubes in the tube support structure and tube sheet; and,
replacing the upper portion of the shell.

13. A method for retubing a steam generator having a shell with an enlarged upper portion, a tube sheet with a channel head, a plurality of U-shaped tubes which extend upwardly from the tube sheet to form a tube bundle, and a wrapper encircling the tube bundle, the method being applicable to a steam generator vertically oriented in a containment vessel and comprising the steps of:

making a circumferential cut in the upper portion of the shell;
removing the upper portion of the shell;
enclosing the lower portion of the shell with a hood to form a generally air tight enclosure;
cutting the tubes in segments having a length generally equal to the distance between support sheets and removing the segments after they are cut, starting at the U-bends and working downwardly toward the tube sheet;
removing the stub ends of tubes from the tube sheet;
installing new tubes in the lower portion of the shell; and,
replacing the upper portion of the shell.

14. A method of retubing a steam generator having a shell with an enlarged upper portion, a tube sheet with a channel head, a plurality of U-shaped tubes which extend upwardly from the tube sheet to form a tube bundle and a wrapper encircling the tube bundle, the method being applicable to a steam generator vertically oriented in a containment vessel and comprising the steps of:

making a circumferential cut in the upper portion of the shell;
removing the upper portion of the shell;
enclosing the lower portion of the shell with a hood to form a generally air tight enclosure;
cutting the tubes in segments having a length generally equal to the distance between support sheets and removing the segments after they are cut starting from the U-bend and working downwardly toward the tube sheet;
utilizing a controlled environment work station within the shell for directly observing cutting segments of tubes from the tube bundle and removing the cut segments from the shell;
removing the stub ends of the tubes from the tube sheet;
installing a tube support system in the lower portion of the shell;
installing new tubes in the support system and tube sheet; and
replacing the upper portion of the shell.

15. A method for retubing a steam generator having a shell with an enlarged upper portion, a tube sheet with a channel head, a plurality of U-shaped tubes which extend upwardly from the tube sheet to form a tube bundle, and a wrapper encircling the tube bundle, the method being applicable to a steam generator vertically oriented in a containment vessel and comprising the steps of:

making a circumferential cut in the upper portion of the shell;
removing the upper portion of the shell;
enclosing the lower portion of the shell with a hood;
cutting the tubes in segments having a length generally equal to the distance between the support sheets and removing the segments after the tube is cut starting at the U-bend and working downward toward the tube sheet;

placing a gondola having means for cutting tube segments from the tube bundle and means for remotely handling the cut segments in the hood and bottom portion of the shell to provide a controlled environment work station from which the cutting of the tubes is observed;

lowering the gondola into the shell as the tube segments are cut and removed;

removing tube stubs from the tube sheet;

installing a tube support structure;

installing new tubes in the tube support structure and tube sheet;

seal welding the new tubes at the junctures of the end of the tube and the tube sheet; and, replacing the upper portion of the shell.

16. A method for retubing a steam generator having a shell with an enlarged upper portion, a tube sheet with a channel head, a plurality of U-shaped tubes which extend upwardly from the tube sheet to form a tube bundle, and a wrapper encircling the tube bundle, the method being applicable to a steam generator vertically oriented in a containment vessel and comprising the steps of:

making a circumferential cut in the upper portion of the shell;

removing the upper portion of the shell;

enclosing the lower portion of the shell with the hood to form a generally air tight enclosure;

cutting the tubes in segments having a length generally equal to the distance between support sheets and removing the cut segments starting at the U-bends and working downwardly toward the tube sheet;

placing a gondola with a central opening extending therethrough and means for cutting segments from the tubes in the hood and shell to provide a controlled environment work station from which the tube cutting is observed directly and through which the cut segments can be passed;

passing the cut segments through the central opening and out of the hood;

removing the stub ends of the tubes from the tube sheet;

installing new tubes in the lower portion of the shell; and replacing the upper portion of the shell.

17. A method for retubing a steam generator having a shell with an enlarged upper portion, a tube sheet with a channel head, a plurality of U-shaped tubes which extend upwardly from the tube sheet to form a tube bundle, and a wrapper encircling the tube bundle, the method being applicable to a steam generator vertically oriented in a containment vessel and comprising the steps of:

making a circumferential cut through the upper portion of the shell;

removing the upper portion of the shell;

enclosing the lower portion of the shell with a hood to form a generally air tight enclosure;

cutting the tubes in segments and removing the segments starting at the U-bend and working downwardly toward the tube sheet;

placing a gondola, with a central opening extending therethrough and means for cutting the tubes in segments and for removing the cut segments, in the hood and lower portion of the shell, to provide a controlled environment work station from which the tube cutting is observed directly and through which the cut segments are passed;

providing an air lock in the hood through which the cut segments are removed;

removing the stub end of tubes from the tube sheet;

installing new tubes in the lower portion of the shell; and, replacing the upper portion of the shell.

18. A method for retubing a steam generator having a shell with an enlarged upper portion, a tube sheet with a channel head, a plurality of U-shaped tubes which extend upwardly from the tube sheet to form a tube bundle, and a wrapper encircling the tube bundle, the method being applicable to a steam generator vertically oriented in a containment vessel and comprising the steps of:

cutting the shell circumferentially in the upper portion thereof, removing the upper portion of the shell, enclosing the lower portion of the shell with a generally air tight hood;

cutting the tubes in segments and removing the segments starting at the U-bend and working downwardly toward the tube sheet;

placing a gondola, with a central opening extending therethrough and means for remotely cutting segments from the tube and removing the cut segments, in the hood and lower portion of the shell to provide a controlled environment work station from which cutting the tubes in segments is observed directly and through which the segments are removed;

placing an air lock in the hood for removing the tubes therefrom;

providing a downward flow of air through the hood and the shell;

removing the stub ends of tubes from the tube sheet;

installing new tubes in the lower portion of the shell; and, replacing the upper portion of the shell.

19. A method for retubing a steam generator having a shell with an enlarged upper portion, a tube sheet with a channel head, a plurality of U-shaped tubes which extend upwardly from the tube sheet to form a tube bundle, and a wrapper encircling the tube bundle, the method being applicable to a steam generator vertically oriented in a containment vessel and comprising the steps of:

cutting the shell by making a circumferential cut adjacent the upper portion thereof, removing the upper portion of the shell, enclosing the lower portion of the shell with a hood;

cutting the tubes in segments and removing the segments starting at the U-bend and working downwardly toward the tube sheet;

placing a gondola with a central opening extending therethrough and means for cutting segments from the tube and removing the cut segments in the hood and lower portion of the shell to provide a controlled environment work station from which cutting the tubes is observed directly and through which the cut segments are passed;

providing an air lock in the hood through which the cut segments are removed;

providing a downward flow of air through the hood and shell;

filtering the air to remove particulate material as it is drawn from the lower portion of the shell;

removing the stub ends of tubes from the tube sheet;

installing new tubes in the lower portion of the shell; and, replacing the upper portion of the shell.

* * * * *